United States Patent [19]
Thomsen et al.

[11] Patent Number: 4,505,109
[45] Date of Patent: Mar. 19, 1985

[54] HYDRAULIC CONTROL APPARATUS PARTICULARLY STEERING APPARATUS

[75] Inventors: Svend E. Thomsen, Nordborg; Erik Kyster, Augustenborg, both of Denmark

[73] Assignee: Danfoss A/S, Nordborg

[21] Appl. No.: 415,485

[22] Filed: Aug. 30, 1982

Related U.S. Application Data

[63] Continuation of Ser. No. 204,303, Nov. 5, 1980, abandoned.

[30] Foreign Application Priority Data

Nov. 16, 1979 [DE] Fed. Rep. of Germany ....... 2946247

[51] Int. Cl.³ .............................................. F16D 31/02
[52] U.S. Cl. ........................................ 60/386; 91/372; 91/417 R; 91/463
[58] Field of Search ................... 91/165, 166, 372, 374, 91/386, 391, 416, 417 R, 420, 446, 468, 463, 464, 466, 415; 60/384, 386; 137/106

[56] References Cited

U.S. PATENT DOCUMENTS

| | | | |
|---|---|---|---|
| 2,843,093 | 7/1958 | Vltavsky | 91/463 |
| 2,917,125 | 12/1959 | Donner | 60/384 |
| 3,158,167 | 11/1964 | Redelman | 137/106 |
| 3,400,537 | 9/1968 | Mercier | 60/384 |
| 3,436,915 | 4/1969 | Mercier | 91/464 |
| 3,473,324 | 10/1969 | Mercier | 60/386 |
| 3,620,126 | 11/1971 | Fuhrimann | 137/625.69 |
| 4,051,766 | 10/1977 | Strauff | 91/417 |

FOREIGN PATENT DOCUMENTS

| | | | |
|---|---|---|---|
| 484003 | 6/1952 | Canada | 137/106 |
| 1465422 | 12/1966 | France | |

*Primary Examiner*—Abraham Hershkovitz
*Attorney, Agent, or Firm*—Wayne B. Easton

[57] ABSTRACT

The invention relates to a steering assembly having a bidirectional servomotor of the differential piston type which is connectable to steerable wheels. A directional control valve unit has a spool valve with two collars which cooperates with the housing to form first and second end control chambers and a middle chamber. A power circuit supplies pressurized fluid equally to the end control chambers and a manually operable control pump is operable to selectively and incrementally increase and decrease the pressures in the end chambers in a push-pull mode to effect movement of the servomotor piston in either direction. The control valve has two ports connected to opposite ends of the servomotor with one port providing fixed and constant fluid communication between the first valve chamber and one side of the servomotor. The other valve unit port is cooperable with one of the collars of the spool valve to provide a dual throttling action wherein oppositely acting throttling occurs between the port and the middle and second valve chambers depending on the axial position of the spool valve. Control pressure from the manually operated pump which moves the spool valve incrementally one way or the other causes the throttling collar to either admit additional pressurized fluid to the associated end of the servomotor or release pressurized fluid therefrom to the middle chamber.

4 Claims, 1 Drawing Figure

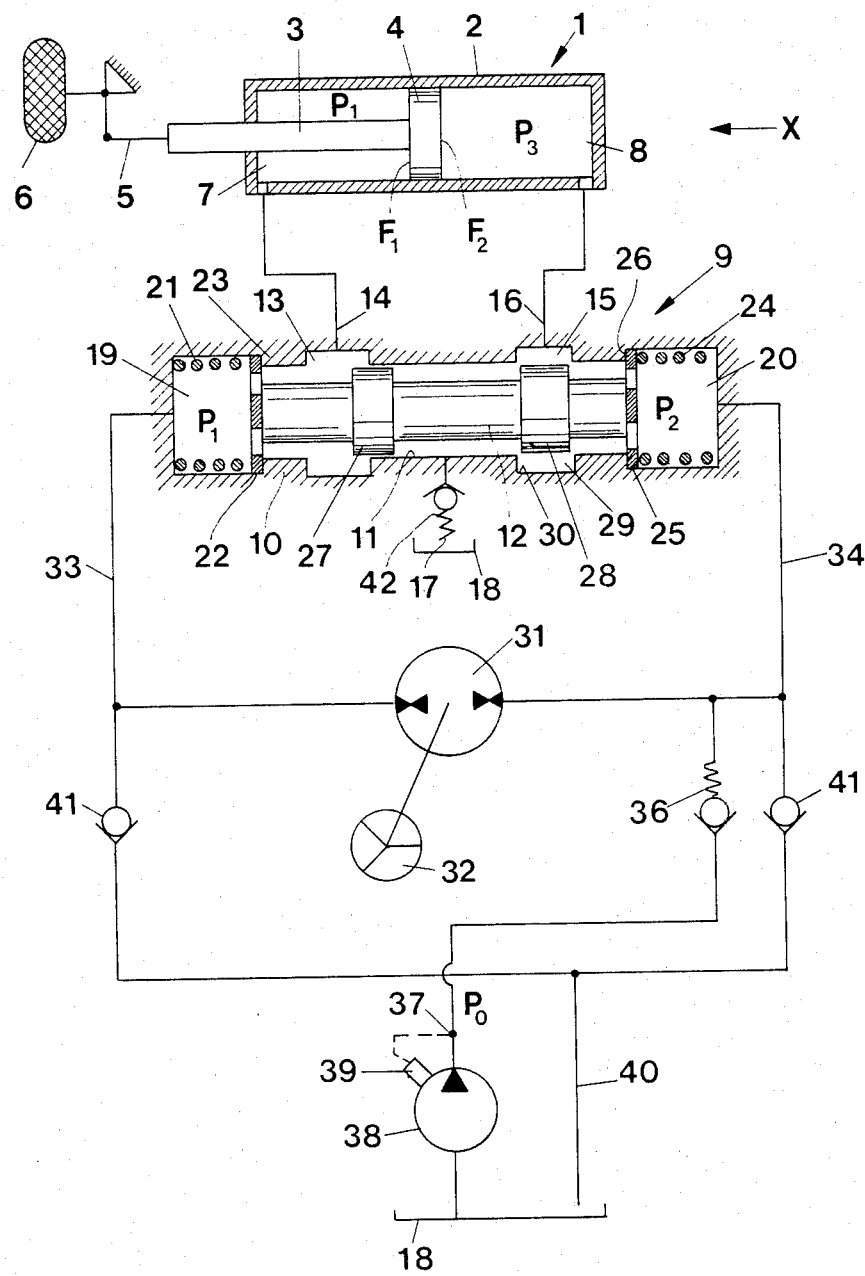

HYDRAULIC CONTROL APPARATUS PARTICULARLY STEERING APPARATUS

This is a continuation of application Ser. No. 204,303, filed on Nov. 5, 1980, now abandoned.

The invention relates to a hydraulic control apparatus, particularly a steering apparatus, comprising a control valve device which is connected by way of a first and a second operating connection to a respective pressure chamber of a piston-cylinder unit and by way of a tank connection to a tank and which comprises a valve slide loaded by neutral position springs and at the end by the pressure in two control pressure chambers which are connected to a respective connection of a control pump adjustable a manual actuating element and to a main pump by way of a check valve device.

In a known control apparatus of this kind (FR-PS No. 14 65 422, (FIG. 4), the valve slide has two collars which close the operating connections in the neutral position and, upon displacement, connect the one operating connection to a control pressure chamber and the other operating connection to the tank connection. The main pump is connected by a respective check valve directly to both control pressure chambers and in the neutral position by way of a short-circuit path to the tank connection. Upon adjustment of the manual actuating element, the pressure in the two control pressure chambers is changed so that the valve slide is displaced out of its neutral position. Pressure medium will then flow from the main pump by way of a check valve, the control pump and one control pressure chamber into the one pressure chamber of the piston-cylinder unit whereas the other pressure chamber is connected to the tank. Both pressure chambers of the piston-cylinder units have the same effective area. In this case it is a disadvantage that the manual actuating element must first traverse a certain idling distance before the piston-cylinder unit can be moved because the control slide must first be moved by a certain distance before the one operating connection can be fed with pressure fluid.

The invention is based on the problem of providing a hydraulic control apparatus of the aforementioned kind in which adjustment of the manual actuating element immediately leads to adjustment of the piston-cylinder unit, i.e. without any lost motion zone in the region of the neutral position.

This problem is solved in accordance with the invention in that the piston-cylinder unit comprises a differential piston, that the operating connection leading to the pressure chamber of smaller effective area is permanently connected to the first control pressure chamber and is separated from the tank connection, and that two throttles are provided which are adjustable in opposite senses by the valve slide and of which one throttle connects the second control pressure chamber to the second operating connection and the other throttle connects the second operating connection to the tank connection.

In this construction, the two oppositely adjustable throttles form a pressure divider. The pressure derived between the two throttles produces in the pressure chamber of larger effective area of the piston-cylinder unit a force which is compared with a force produced by the unreduced pressure in the pressure chamber of smaller effective area. With the aid of the control pump adjustable by the manual actuating element, pressure differences result in the two control pressure chambers, by reason of which the valve slide is displaced. This displacement immediately leads to a pressure change between the two throttles and thus to a displacement of the piston in the one or other direction. A further advantage is that external forces acting on the piston lead to displacement of the valve slide such that the external force is compensated by hydraulic forces. In addition, the occurrence of this external force is noticeable at the manual actuating element by way of the control pump so that opposite control can also be exerted by hand.

In a particularly simple embodiment, for the purpose of forming both throttles an annular groove connected to the second operating connection co-operates in the housing of the control valve device with a collar on the valve slide that has a shorter axial length than the annular groove. A very simply constructed valve slide in a very simply constructed housing will therefore be sufficient to achieve the desired result.

It is advisable to use a pressure-controlled main pump. This ensures that one always starts from the same pressure level, which simplifies the design of the two throttles in comparison with the effective areas of the two pressure chambers of the piston-cylinder unit.

In a preferred embodiment, the check valve device comprises a single check valve 36 and the main pump 38 is connected by way of this check valve to the second control pressure chamber 20 and by way of the series circuit of the check valve and control pump 31 to the first control pressure chamber 19. This results in a simpler construction than if one uses the conventional two check valves but it does not affect the function.

In addition, the check valve may be spring-influenced. This ensures that slight fluctuations in the column of pressure medium or vibrations of the kind occurring during the travel of a vehicle will not lead to malfunctioning.

Preferably, both control pressure chambers 19, 20 are connected to the tank 18 by a respective check valve 41, 41' which opens towards them. This permits emergency operation solely with the aid of the control pump if the main pump fails.

For emergency operation is also favourable if the tank connection of the control valve 9 is connected to the tank 18 by way of a spring-influenced check valve 42 opening towards the control valve.

The invention will now be described by way of a preferred example with reference to the drawing which shows a hydraulic control apparatus according to the invention by way of a circuit diagram.

A piston-cylinder unit 1 comprises a cylinder 2 and a differential piston 4 which is connected at one side to a piston rod 3 and which swings by way of a linkage 5 a wheel 6 that is to be steered. In the cylinder, there is a first pressure chamber 7 of smaller effective area F1 and a second pressure chamber 8 of larger effective area F2.

A control valve device 9 comprises a housing 10 with a bore 11 and a valve slide 12. In the housing there is an annular groove 13 which communicates with a first operating connection 14 leading to the pressure chamber 7. A second annular groove 15 communicates with a second operating connection 16 which leads to the pressure chamber 8. Further, there is a tank connection 17 leading to the tank 18. At the ends, there are two control pressure chambers 19 and 20. In the control pressure chamber 19 there is a neutral position spring 21 which acts on an apertured disc 22. The latter is supported either against a step 23 of the housing or at one end of the valve slide 12. A neutral position spring 24 in the control pressure chamber 20 is supported on an apertured disc 25. The latter abuts either a step 26 in the housing or the other end of the valve slide 12. A first collar 27 on the valve slide 12 separates the control pressure chamber 19 from the chamber connected to the tank connection 17. Together with the annular groove 16, a second collar 28 of shorter axial length than the annular groove 15 forms two throttles 29 and 30 which vary in opposite senses on displacement of the valve slide 20.

A control pump 31 is adjustable by way of a manual actuating element 32. The two sides of the control pump 31 are connected to connecting conduits 33 and 34, respectively, which lead to the control pressure chambers 19 and 20, respectively. The connecting conduit 34 is in addition connected by way of a spring-influenced check valve 36 to the pressure side 37 of a main pump 38 which has a pressure control device 39 for holding the output pressure constant. Two suction paths 40, 40' each having a check valve 41, 41' lead from the connecting conduits 33 and 34 to the tank 18. The tank connection 17 is associated with a check valve 42 which is so strongly loaded by a spring that, during emergency operation, the valve slide 12 can be displaced towards the left under the pressure produced by the control pump 31 without the check valve 42 opening.

With such a control apparatus, the operation is as follows.

In the illustrated neutral position, the main pump 38 produces a pressure $P_0$. The pressure $P_1$ in the control pressure chamber 19 and the pressure $P_2$ in the control pressure chamber 20 are substantially equal to $P_0$. The pressure $P_1$ also obtains in the pressure chamber 7. On the other hand, in the pressure chamber 8 there is a pressure $P_3$ because, by way of the check valve 36 and the two throttles 29 and 30, there is a permanent small flow of pressure medium leading to a division of pressure at the operating output 16. The ratio of the throttle resistances in the neutral position is selected so that in the neutral position $P_1 \times F_1 = P_3 \times F_2$. By reason of this equilibrium of forces, the piston 4 remains stationary.

On rotation of the actuating element 32 towards the left, $P_1$ is increased slightly. The valve slide 12 is correspondingly displaced towards the right. The resistance of the throttle 29 increases whilst that of the throttle 30 drops. Consequently the reduced pressure $P_3$ drops. The piston 4 is therefore moved to the right. Pressure fluid is delivered by the main pump 38 by way of the check valve 36, the control pump 31 and the control pressure chamber 19 into the pressure chamber 7 whilst pressure fluid can simultaneously flow out of the pressure chamber 8 by way of the throttle 30 to the tank 18.

If the actuating element is turned to the right, the valve slide 12 is displaced to the left. The intermediate pressure $P_3$ between the throttles 29 and 30 therefore increases. The piston 4 is pushed to the left. Pressure fluid flows from the main pump 38 by way of the check valve 36 and the control pressure chamber 20 to the pressure chamber 8. The pressure fluid simultaneously displaced out of the pressure chamber 7 likewise arrives in the pressure chamber 8 by way of the control pump 31.

If the main pump 38 fails, emergency operation can be maintained with the aid of the control pump 31. If the piston 4 is to be displaced to the left, the additionally required pressure fluid can be fed by way of the suction conduit 40', the check valve 41' as well as the control pump 31 to the pressure chamber 8. If displacement of the piston 4 is desired to the right, the required pressure fluid can be fed by way of the suction conduit 40, the check valve 41 as well as the control pump 31 to the pressure chamber 7, it being possible for the fluid delivered by the pressure chamber 8 to flow to the tank 18 by way of the check valve 42.

If an external force acts on the piston 4 in the direction of the arrow X whereas the actuating element 32 is held tight, the piston 4 is displaced slightly to the left, whereby the valve slide 12 is moved to the right as a result of the pressure rise in the control pressure chamber 19. This increases the resistance of the throttle 29 which leads to a reduction in the pressure $P_3$. This corresponds to compensation of the external force. At the same time, the increase in pressure of $P_1$ becomes noticeable at the control pump 31 by way of a corresponding pulse so that the user encounters a slight impact on the actuating element 32 and can exert opposite control. If the force acts opposite to the direction of the arrow X, the conditions are similar except that the valve slide 12 is displaced to the left, whereby the pressure $P_3$ is increased and the external force is compensated in this manner.

If the actuating element 32 is not held tight on the occurrence of the external force, it will turn depending on the displacement of the piston 4. On the occurrence of the external force, it is also possible to brake the displacement of the piston by applying a braking torque to the actuating element 32. If the external force is not very large, there are no objections to assist the displacement of the piston that is caused thereby with a like-acting adjustment of the actuating element.

The conduit 37 can also be connected directly to the connecting conduit 33 by way of a further check valve similar to the check valve 36. Further, the check valves 41, 41' may be combined as a single check valve which only bridges the main pump 38 if there is no objection during emergency control operation to the forces that are necessary to open the check valve 36 or the similar further check valve.

We claim:

1. A steering assembly, comprising, a piston cylinder unit having a differential piston forming first and second expansible chambers with smaller and larger effective areas, respectively and first and second port means opening into said first and second chambers respectively, a control valve having a housing and spool valve with first and second spaced apart collars slidably disposed in said housing and forming a central valve chamber and first and second valve chambers at opposite ends of said control valve housing for respectively receiving pressurized fluid to regulate the position of said spool valve, spring means for biasing said spool valve towards a neutral position, said housing having a first and a second port having fluid communication with said piston cylinder unit first and second port means, respectively, said first valve chamber having constant and unobstructed fluid communication with said control valve housing first port, said second collar forming dual throttling means relative to said control valve housing second port when said spool valve is in a neutral position and in an operative turning position to provide oppositely acting throttling between said control valve housing second port and said central and second valve chambers, said control valve housing having exhaust port means for the egress of fluid in said central valve chamber, supply pump means for supplying pressurized fluid to said first and second valve chambers, and manually operable pump means for selectively and incrementally increasing and decreasing the pressures of said first and second valve chambers in a pushpull mode to effect movement of said piston in either direction.

2. A steering assembly according to claim 1 wherein said housing ports include annular grooves formed in said housing, said second collar having a shorter axial length than said groove associated with the second port so that the sides of said second collar have throttling actions with the sides of said groove associated with the second port dependent upon the adjusted position of said spool valve.

3. A steering assembly according to claim 1 including a circuit wherein said control pump has opposite sides thereof connected to said first and second valve chambers, said supply pump means being connected in said circuit between said control pump and said second valve chamber, and check valve means for the output side of said supply pump means.

4. A steering assembly according to claim 1 wherein said valve unit central chamber exhaust port means is equipped with spring biased check valve means.

* * * * *